US009957171B2

(12) United States Patent
Chung et al.

(10) Patent No.: US 9,957,171 B2
(45) Date of Patent: May 1, 2018

(54) COMPOSITE AND ELECTRODE FOR ELECTROCHEMICAL REMOVAL OF PHOSPHORUS, AND APPARATUS AND METHOD USING THE ELECTRODE

(71) Applicant: Industrial Technology Research Institute, Chutung, Hsinchu County (TW)

(72) Inventors: Li-Ching Chung, Chutung (TW); Teh-Ming Liang, Chutung (TW); Ren-Yang Horng, Chutung (TW); Hsin Shao, Chutung (TG); Po-I Liu, Chutung (TW); Min-Chao Chang, Chutung (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 685 days.

(21) Appl. No.: 14/575,202

(22) Filed: Dec. 18, 2014

(65) Prior Publication Data

US 2015/0175450 A1 Jun. 25, 2015

(30) Foreign Application Priority Data

Dec. 19, 2013 (TW) .............................. 102147137 A

(51) Int. Cl.
*C02F 1/46* (2006.01)
*C02F 1/461* (2006.01)
(Continued)

(52) U.S. Cl.
CPC .......... *C02F 1/46109* (2013.01); *B01J 20/06* (2013.01); *B01J 20/20* (2013.01); *B01J 20/2803* (2013.01);
(Continued)

(58) Field of Classification Search
None
See application file for complete search history.

(56) References Cited

U.S. PATENT DOCUMENTS 6,107,354 A 8/2000 Shaniuk et al.
6,309,532 B1 10/2001 Tran et al.
(Continued)

FOREIGN PATENT DOCUMENTS

CN 1371299 A 9/2002
CN 1522968 A 8/2004
(Continued)

OTHER PUBLICATIONS

Office Action issued in Taiwan Application No. 102147137 dated Jun. 30, 2015.
(Continued)

*Primary Examiner* — Arun S Phasge
(74) *Attorney, Agent, or Firm* — McCarter & English, LLP; Yu Lu

(57) ABSTRACT

A composite is provided, the composite comprises a carbon support, and a layered double hydroxide (LDH) immobilized on the carbon support for selectively removing phosphorus. An electrode for electrochemical removal of phosphorus, and methods and apparatuses for electrochemical purification by utilizing the electrode are also provided.

17 Claims, 5 Drawing Sheets

(51) Int. Cl.
        C02F 1/28        (2006.01)
        C02F 1/469       (2006.01)
        B01J 20/06       (2006.01)
        B01J 20/20       (2006.01)
        B01J 20/28       (2006.01)
        B01J 20/32       (2006.01)
        C02F 101/10      (2006.01)

(52) U.S. Cl.
        CPC ..... B01J 20/28011 (2013.01); B01J 20/3204 (2013.01); B01J 20/3236 (2013.01); C02F 1/288 (2013.01); C02F 1/469 (2013.01); C02F 2001/46138 (2013.01); C02F 2101/105 (2013.01)

(56) References Cited

U.S. PATENT DOCUMENTS

| | | | |
|---|---|---|---|
| 6,645,366 | B2 | 11/2003 | Iseki et al. |
| 7,300,591 | B2 | 11/2007 | Ikematsu et al. |
| 7,625,492 | B2 * | 12/2009 | Jin ................. B01D 53/02 |
| | | | 204/518 |
| 7,758,756 | B2 | 7/2010 | Kim |
| 8,187,861 | B1 | 5/2012 | Schuh |
| 8,361,327 | B2 | 1/2013 | Lee et al. |
| 8,460,520 | B2 | 6/2013 | Rigby |

FOREIGN PATENT DOCUMENTS

| | | |
|---|---|---|
| CN | 101066526 A | 11/2007 |
| CN | 101236870 A | 8/2008 |
| CN | 101269870 A | 9/2008 |
| CN | 101304945 A | 11/2008 |
| CN | 101718738 A | 6/2010 |
| CN | 102350279 A | 2/2012 |
| CN | 102441365 A | 5/2012 |
| JP | 2007038203 A | 2/2007 |
| JP | 2012035183 A | 2/2012 |
| TW | 585840 B | 5/2004 |
| TW | 200942323 A | 10/2009 |
| TW | 200942495 A | 10/2009 |
| TW | I376355 B | 11/2012 |
| TW | I487661 B | 6/2015 |

OTHER PUBLICATIONS

CN 101304945 English abstract.
CN 1522968A English abstract.
JP 2012035183A English abstract.
Avraham et al., "Developing Ion Electroadsorption Stereoselectivity, by Pore Size Adjustment with Chemical Vapor Deposition onto Active Carbon Fiber Electrodes. Case of Ca2+/Na+ Separation in Water Capacitive Desalination," *J. Phys. Chem. C.*, 112(19):7385-7389 (2008).
Bilyk et al., "Nutrient Recovery: State of the Knowledge," Water Environment Research Foundation (WERF), pp. 1-44 (2010).
Chitrakar et al., "Adsorption of phosphate from seawater on calcined MgMn-layered double hydroxides," *J. Colloid Interface Sci.*, 290:45-51 (2005).
Cordell, "The Story of Phosphorus—Sustainability implications of global phosphorus scarcity for food security," pp. 1-240 (2010).
Cornel and Schaum, "Phosphorus Recovery from Wastewater: Needs, Technologies and Costs," *Water Sci. Tech.—WST*, 59.6:1069-1076 (2009).
He et al., "High adsorption selectivity of ZnAl layered double hydroxides and the calcined materials toward phosphate," *J. Colloid Interface Sci.*, 343:225-231 (2010).
Kalogo and Monteith, "The State of Science Report: Energy and Resource Recovery from Sludge," Water Environment Research Foundation (WERF), www.werf.org, pp. 1-238 (2008).
Kang et al., "Use of Iron Oxide Particles as Adsorbent to Enhance Phosphorus Removal from Secondary Wastewater Effluent," *Separation Sci. Tech.*, 38(15):3853-3874 (2003).
Kim and Choi, "Selective removal of nitrate ion using a novel composite carbon electrode in capacitive deionization," *Water Research*, 46:6033-6039 (2012).
Morse et al., "Review: Phosphorus removal and recovery technologies," Science of the Total Environment, 212(1):69-81 (1998).
Smith and Dassanayake, "Energy Conservation and Recovery in Wastewater Treatment Facilities," OWEA 2010 Biosolids Specialty Workshop, Columbus, OH, pp. 1-42 (2010).
Yang et al., "Ion-selective carbon nanotube electrodes in capacitive deionization," *Electrochimica Acta*, 91:11-19 (2013).
JP 2007038203 English abstract.
TW 585840 English abstract.
CN 1371299 English Abstract.
CN 101066526 English Abstract.
Office Action dated Mar. 23, 2016 in CN 201410489591.3.
CN101236870 English abstract.
CN102441365 English abstract.
TW200942495 English abstract.
CN 101718738 English abstract.
CN 102350279 English abstract.
Office Action dated Mar. 15, 2016 in TW 102147137.
Halim et al., "Comparison study of ammonia and COD adsorption on zeolite, activated carbon and composite materials in landfill leachate treatment," *Desalination*, 262:31-35 (2010).
Reháková et al., "Agricultural and agrochemical uses of natural zeolite of the clinoptilolite type," *Current Opinion in Solid State and Materials Science*, 8:397-404 (2004).
Wang et al., "Ion exchange of ammonium in natural and synthesized zeolites," *J. Hazardous Mater.*, 160:371-375 (2008).
Weatherley and Miladinovic, "Comparison of the ion exchange uptake of ammonium ion onto New Zealand clinoptilolite and mordenite," *Water Research*, 38:4305-4312 (2004).
Zhang et al., "Separation and preconcentration of trace indium(III) from environmental samples with nanometer-size titanium dioxide," *Hydrometallurgy*, 95:92-95 (2009).
CN 101269870 English abstract.
TW I376355 English abstract.
TW I487661 English abstract.

* cited by examiner

US 9,957,171 B2

COMPOSITE AND ELECTRODE FOR ELECTROCHEMICAL REMOVAL OF PHOSPHORUS, AND APPARATUS AND METHOD USING THE ELECTRODE

CROSS-REFERENCE TO RELATED APPLICATIONS

This application claims foreign priority under 35 U.S.C. § 119(a) to Patent Application No. 102147137, filed on Dec. 19, 2013, in the Intellectual Property Office of Ministry of Economic Affairs, Republic of China (Taiwan, R.O.C.), the entire content of which patent application is incorporated herein by reference and made a part of this specification.

BACKGROUND OF THE INVENTION

1. Technical Field

The present invention is directed to water purification. Specifically, the present invention is directed to a composite, an electrode comprising the composite, an apparatus comprising the electrode and a method for electrochemical removal of phosphorus.

2. Description of Related Art

The regulations to the phosphorus content of discharged wastewater are getting stricter in many countries. Also, in consideration of the benefits of the resources reservation, the technique developments of removal and recovery of phosphorus have drawn much attention in the worldwide.

The concept involving wastewater treatment as well as resource recovery has been popularized in recent years. Before the wastewater is discharged, the phosphorus needs to be removed to meet the regulations. If the phosphorus can be recovered simultaneously, the treatment process will be more profitable. Nearly all phosphorus existing in the wastewater is in the form of phosphate such as organophosphate, polyphosphate and orthophosphate. The phosphorus concentration is generally low, thereby influencing the removal efficiency of phosphorus. Further, the wastewater contains many kinds of salts at the same time such as sulfate, carbonate and nitrate. The economic benefits of the recovery of phosphorus mainly depend on the target content in the raw water, the selectivity to phosphorus and the cost of the recovery technique. Therefore, increasing the phosphorus selectivity of the technique is useful to enhance the benefits of the recycling of phosphorus.

The current techniques for removal of phosphorus are mainly chemical precipitation method, biological treatment process and adsorption method. Among these techniques, the chemical precipitation method uses a variety of cations to effectively precipitate and remove phosphorus in the wastewater by adding chemical agents such as magnesium chloride, calcium chloride or ammonium bicarbonate precipitant. However, this method has poor selectivity to phosphorus, such that they are usually deposed as waste residue for landfill. The phosphorus can be recovered only when the complicated purification process is applied. In addition, the performance of chemical precipitation method is affected by the pH value, the chemical adding position and the addition dosage. Also, such method requires large quantity of chemical agents and needs the storage space and equipment, and it would produce a lot of sludge. Thus, the chemical precipitation method frequently causes the increased cost of the factory construction and maintenance.

As to the conventional biological treatment process, the content of phosphorus taken by the microorganisms is limited. Further, the microorganisms in such system are easily affected by the quality of the wastewater. Thus, the operation of the biological treatment process is unstable.

The adsorption method removes and recovers phosphorus by using the adsorbent to perform adsorption and ion exchange. The examples of the known adsorbents are silica gel, activated carbon, zeolite, molecular sieve, clay, ion-exchange resin and so on. The adsorbents need to be further modified with the different functional groups towards the specific cation or anion removal. However, the selectivity of the adsorbents is usually low, such that the adsorbents easily adsorb impurity. Further, the frequent regeneration of adsorbents consumes large amounts of acid and base reagents. Generally, the consumption ratio of regenerant and resin is about 1.5 to 5 and therefore this method is not environmentally friendly. Moreover, the common adsorbents also have the disadvantages that the specific surface area of the adsorbents is low, the adsorption rate is low (the reaction reached adsorption equilibrium after 24 to 72 hours) and it is difficult to separate the suspended powder adsorbents.

SUMMARY OF THE INVENTION

A method for electrochemical removal of phosphorus, which is capable of rapidly achieving the effect of selectively removing phosphorus, is provided. The present invention further provides a composite, an electrode for electrochemical removal of phosphorus and an apparatus comprising the electrode and a method for electrochemical removal of phosphorus.

A composite comprises a carbon support and a layered double hydroxide immobilized on the carbon support. The carbon support is used for distributing the layered double hydroxide and providing a pathway for electron conduction.

An electrode comprises a current collector and a composite mounted on the current collector. The composite comprises a carbon support and a layered double hydroxide immobilized on the carbon support.

The present invention further provides an apparatus for electrochemical removal of phosphorus, comprising at least one electrochemical cell comprising a pair of distal electrodes disposed in the electrochemical cell and a plurality of median electrodes disposed in the electrochemical cell and placed between the pair of distal electrodes. The distal electrodes and the plurality of median electrodes are the electrode for electrochemical removal of phosphorus according to the present invention.

The present invention further provides a method for electrochemical removal of phosphorus, comprising feeding a liquid containing phosphorus through the apparatus for electrochemical removal of phosphorus according to the present invention; and applying a voltage to the electrodes for enhancing the effect of layered double hydroxide for selectively removing phosphorus by electric-driving force.

DETAILED DESCRIPTION OF THE INVENTION

Figure 1:
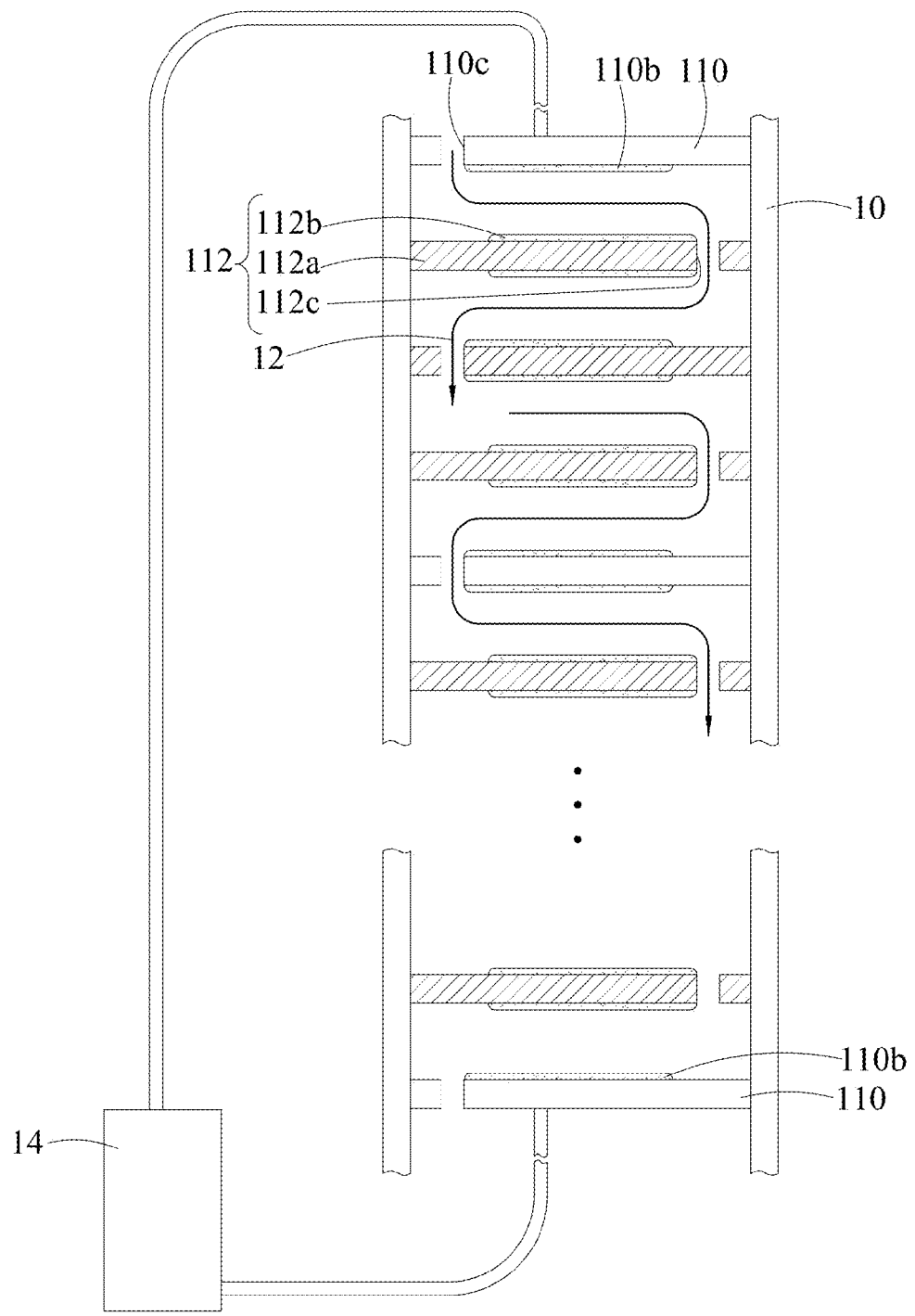
FIG. 1 is a cross-sectional view of the apparatus for electrochemical removal of phosphorus according to the present invention.

The following specific examples are used for illustrating the present invention. A person skilled in the art can easily conceive the other advantages and effects of the present invention.

The present invention provides a composite for electrochemical removal of phosphorus, comprising a carbon support and a layered double hydroxide (LDH) immobilized on the carbon support. The carbon support is used for distributing the layered double hydroxide.

In one embodiment, the carbon support comprises at least one selected from the group consisting of activated carbon, bamboo charcoal, carbon nanotube, graphene and acetylene black.

In one embodiment, the layered double hydroxide according to the present invention can be Mg—Mn layered double hydroxide, Zn—Al layered double hydroxide or Mg—Al—Zr layered double hydroxide. The method for preparing such layered double hydroxides can be referred to R. Chitrakar, S. Tezuka, A. Sonoda, K. Sakane, K. Ooi, T. Hirotsu, "Adsorption of phosphate from seawater on calcined MgMn-layered double hydroxides," *Journal of Colloid and Interface Science* 290:45-51 (2005); or R. Chitrakar, S. Tezuka, A. Sonoda, K. Sakane, K. Ooi, T. Hirotsu, "Synthesis and phosphate uptake behavior of $Zr^{4+}$ incorporated Mg Al-layered double hydroxides," *Journal of Colloid and Interface Science,* 313:53-63 (2007).

In one embodiment, the content of the layered double hydroxide is from 25% to 65%, based on the total weight of the composite.

The electrode for electrochemical removal of phosphorus provided by the present invention comprises a current collector and a composite mounted on the current collector. The current collector is used as a base material for coating the composite. The current collector's shape is not particularly limited. Generally, the current collector has conductivity and its shape is foil, platelet or sheet. In one embodiment, the current collector is made of nickel, copper, titanium, stainless steel or graphite.

In one embodiment, the composite is fixed on the current collector by a binder. The binder is mixed with the composite and adhered on the current collector. The binder can be a polymeric binder, and the polymer having great heat resistance, stability and corrosion resistance can be selected for use. In one embodiment, the binder is a fluorine-containing polymer such as polyvinylidene fluoride or polytetrafluoroethylene.

In one embodiment, the carbon support comprises at least one selected from the group consisting of activated carbon, bamboo charcoal, carbon nanotube, graphene and acetylene black. The electrode can further comprise a conducting component comprising at least one selected from the group consisting of graphite, carbon black, carbon nanotube, graphene and acetylene black. For example, when the carbon support is activated carbon, in addition to the binder, carbon support and layered double hydroxide, the electrode further comprises at least one conducting component selected from the group consisting of graphite, carbon black, carbon nanotube, graphene and acetylene black.

In one embodiment, the content of the layered double hydroxide is from 25% to 65%, based on the total weight of the composite.

The present invention further provides an apparatus for electrochemical removal of phosphorus. As shown in FIG. 1, the apparatus for electrochemical removal of phosphorus comprises at least one electrochemical cell 10; a pair of distal electrodes 110 disposed in the electrochemical cell 10; and a plurality of median electrodes 112 disposed in the electrochemical cell 10 and placed between the pair of distal electrodes 110. In addition, there is at least one liquid passage 12 between the pair of distal electrodes 110 and the plurality of median electrodes 112 for the liquid containing phosphorus to flow. Further, the plurality of median electrodes 112 are the electrodes for electrochemical removal of phosphorus according to the present invention, that is, they comprise a current collector 112a and a composite 112b mounted on the current collector 112a. The composite 112b can be coated on the two sides of the current collector 112a and partly coated on the area of each side of the current collector 112a as shown in FIG. 1. However, the composite 112b also can be coated on the entire side of the current collector 112a.

In one embodiment, the pair of distal electrodes 110 are the electrodes for electrochemical removal of phosphorus according to the present invention. Taking FIG. 1 for example, the composite 110b is mounted on the surface of the current collector of the distal electrode 110.

As shown in the embodiment of FIG. 1, the liquid passage 12 consists of at least one perforation 112c of each of the median electrodes 112.

In addition, the distal electrodes 110 also can have perforations 110c to form the liquid passage 12. Moreover, the apparatus for electrochemical removal of phosphorus can have a plural of electrochemical cells to form a module for feeding a liquid through by the liquid passage 12.

For the specific implementation, the apparatus for electrochemical removal of phosphorus 1 according to the present invention further comprises a power source 14 electrically connected to the pair of distal electrodes 110 and the median electrodes 112.

Figure 2:
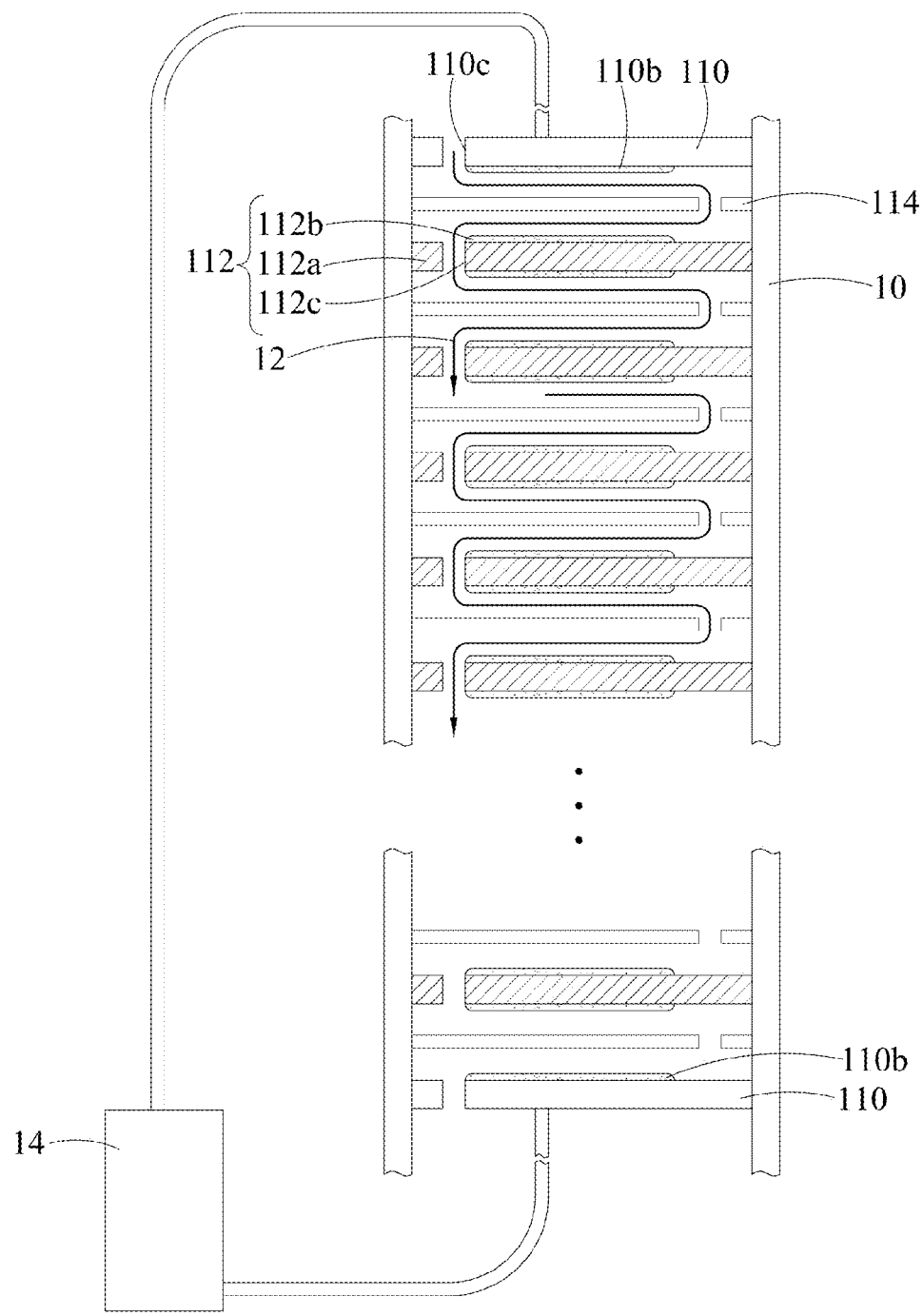
FIG. 2 is a cross-sectional view of another embodiment of the apparatus for electrochemical removal of phosphorus according to the present invention.

As shown in the embodiment of FIG. 2, any two of the median electrodes 112 have an insulator 114 disposed therein between, and/or the distal electrode 110 and the median electrode 112 have an insulator 114 disposed therein between.

The present invention further provides a method for electrochemical removal of phosphorus, comprising feeding a liquid containing phosphorus through the apparatus for electrochemical removal of phosphorus; and applying a voltage to the electrodes for electrochemically removing phosphorus.

In the method of the present invention, the phosphorus concentration of the liquid fed through the electrochemical cell is from 1 mg/L to 1000 mg/L. By applying a voltage of 0.5V to 2.0V to the plural of median electrodes and the pair of distal electrodes, the phosphorus in the liquid containing phosphorus is rapidly adsorbed by the composite of the electrode of the present invention during electrically driven process.

EXAMPLE

Preparation Example 1: Immobilizing a Layered Double Hydroxide (MgMn-LDH) on a Carbon Support A layered double hydroxide (LDH) material was immobilized on an activated carbon (Activated Carbon, AC) by coprecipitation method.

In this example, MgMn-LDH was selected for being the layered double hydroxides. The synthesis procedure is as follows. First, a mixed solution of 0.03M $MgCl_2$ and 0.01M $MnCl_2$, in which the molar ratio of Mg and Mn is 3:1, was prepared. Subsequently, a mixed solution of 0.2M NaOH and 0.1M $Na_2CO_3$ was prepared, and 2.5 g of activated carbon (AC) was then added into the prepared hydroxide solution. $MgCl_2$ and $MnCl_2$ solution was slowly dropped into the hydroxide solution for controlling the addition amount until the weight ratio of Mg and AC is 0.14:1. Such mixture was stirred continuously with the magnet for 24 hours to reach the crystal nucleation and aging stage.

The synthesized product was washed with the deionized water until the pH value of the eluent was about 7. After that, the synthesized product was oven-dried at 50° C., and it then was calcined in the air for 4 hours. The end product AC/LDH was obtained.

Figure 3:
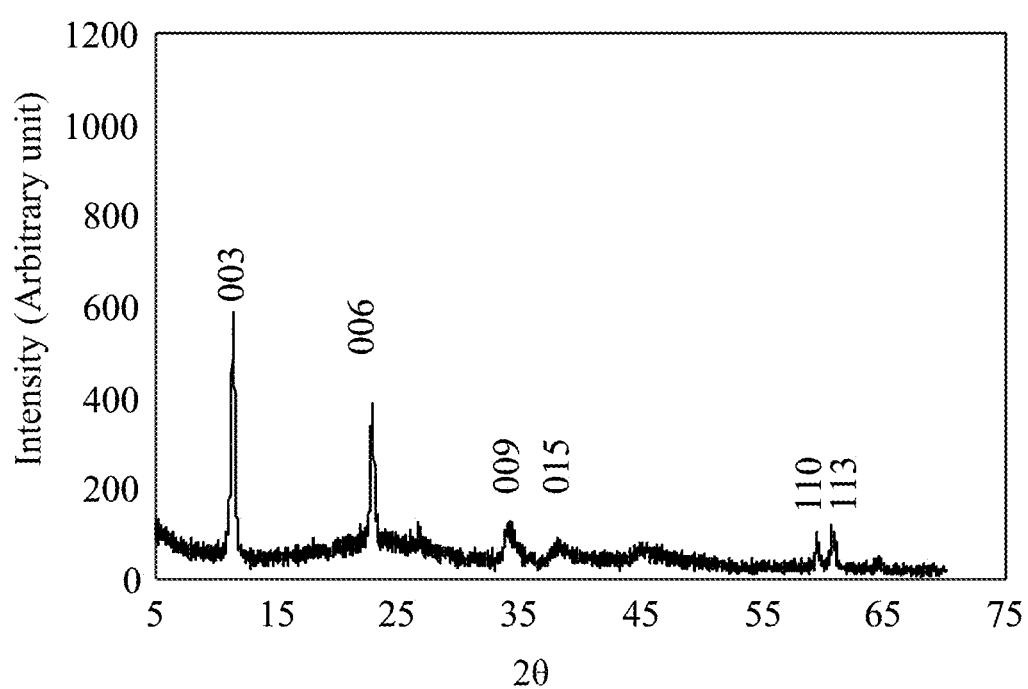
FIG. 3 is an X-ray diffraction (XRD) pattern of the layered double hydroxide immobilized on the carbon support in Preparation Example 1.

The basic characteristics and structure of the carbon layered double hydroxide composite (AC/LDH) were analyzed by XRD, TGA and SEM. As shown in FIG. 3, the crystalline characteristic of AC/LDH that was not calcined at 300° C. was analyzed by XRD. The data indicate that, in the synthesis condition of the molar ratio of Mg:Mn being 3:1, AC/LDH showed the dominant characteristic peak of $[Mg_{0.76}Mn_{0.25}(OH)_2][(CO_3)_{0.14} \cdot 0.72H_2O]$ comprising peaks [003], [006] and [009]. Accordingly, it is confirmed that MgMn-LDH was indeed immobilized on the surface of the activated carbon.

Figure 4:
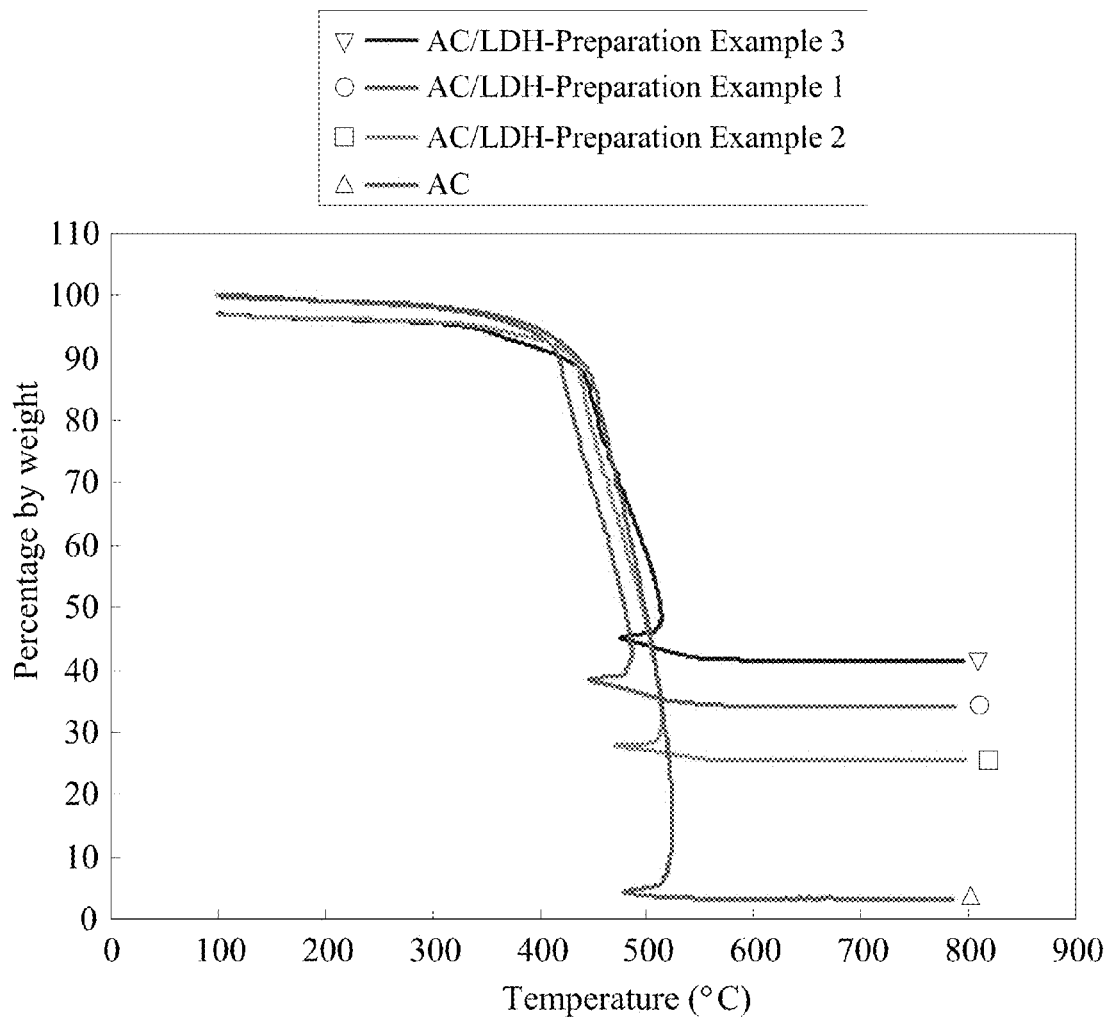
FIG. 4 is a thermogravimetric analysis (TGA) pattern of the activated carbon and the layered double hydroxide immobilized on the carbon support in Preparation Example 1, Preparation Example 2, and Preparation Example 3.
Figure 5:
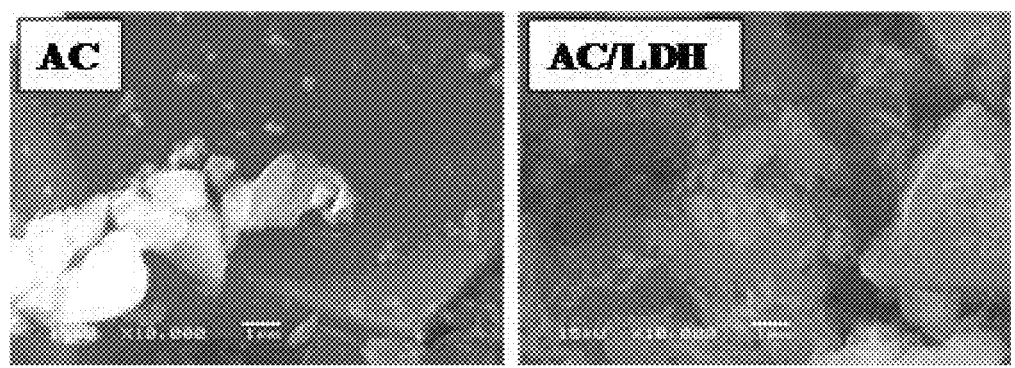
FIG. 5 is a scanning electron microscope (SEM) pattern of the activated carbon and layered double hydroxide immobilized on the carbon support in Preparation Example 1.

The analysis result by TGA as shown in FIG. 4 was calculated, and the calculations indicated that the content of MgMn-LDH in the composite was 50%. FIG. 5 showed the surface morphology analysis by SEM. The analysis result indicates that the surface of the unmodified activated carbon was smooth, and a sheet formed on the surface of the activated carbon modified with MgMn-LDH. Such analysis result is consistent with the sheet-structure of LDH, and it mean that MgMn-LDH was indeed immobilized on the surface of the activated carbon.

Preparation Example 2: Immobilizing a Layered Double Hydroxide (MgMn-LDH) on a Carbon Support A layered double hydroxide (MgMn-LDH) was immobilized on a carbon support according to the procedure described in Preparation Example 1 expect that the weight ratio of Mg and AC is 0.07:1 due to the control of the addition amount of the $MgCl_2$ and $MnCl_2$ solution. The analysis result by TGA as shown in FIG. 4 was calculated, and the calculations indicated that the content of MgMn-LDH was 25%.

Preparation Example 3: Immobilizing a Layered Double Hydroxide (MgMn-LDH) on a Carbon Support A layered double hydroxide (MgMn-LDH) was immobilized on a carbon support according to the procedure described in Preparation Example 1 expect that the weight ratio of Mg and AC is 0.21:1 due to the control of the addition amount of the $MgCl_2$ and $MnCl_2$ solution. The analysis result by TGA as shown in FIG. 4 was calculated, and the calculations indicated that the content of MgMn-LDH was 65%.

Preparation Example 4: Immobilizing a Layered Double Hydroxide (MgAlZr-LDH) on a Carbon Support A layered double hydroxide (MgAlZr-LDH) was immobilized on a carbon support according to the procedure described in Preparation Example 1 expect that the mixed solution was consisting of 0.42M $MgCl_2$, 0.07M $AlCl_3$ and 0.07M $ZrOCl_2$, and its molar ratio of Mg:(Al+Zr) is 3:1. A mixed solution of 0.75M NaOH and 0.25M $Na_2CO_3$ was prepared, and 6 g of activated carbon then added into such mixed solution. The mixed solution of $MgCl_2$, $AlCl_3$ and $ZrOCl_2$ was slowly dropped into the hydroxide solution, and such mixture was stirred continuously with the magnet for 24 hours to accomplish the crystal nucleation and aging stage. The synthesized product was washed with the deionized water until the pH value of the eluent was about 7 and then oven-dried at 50° C. for 72 hours. The end product AC/MgAlZr-LDH was obtained.

Figure 6:
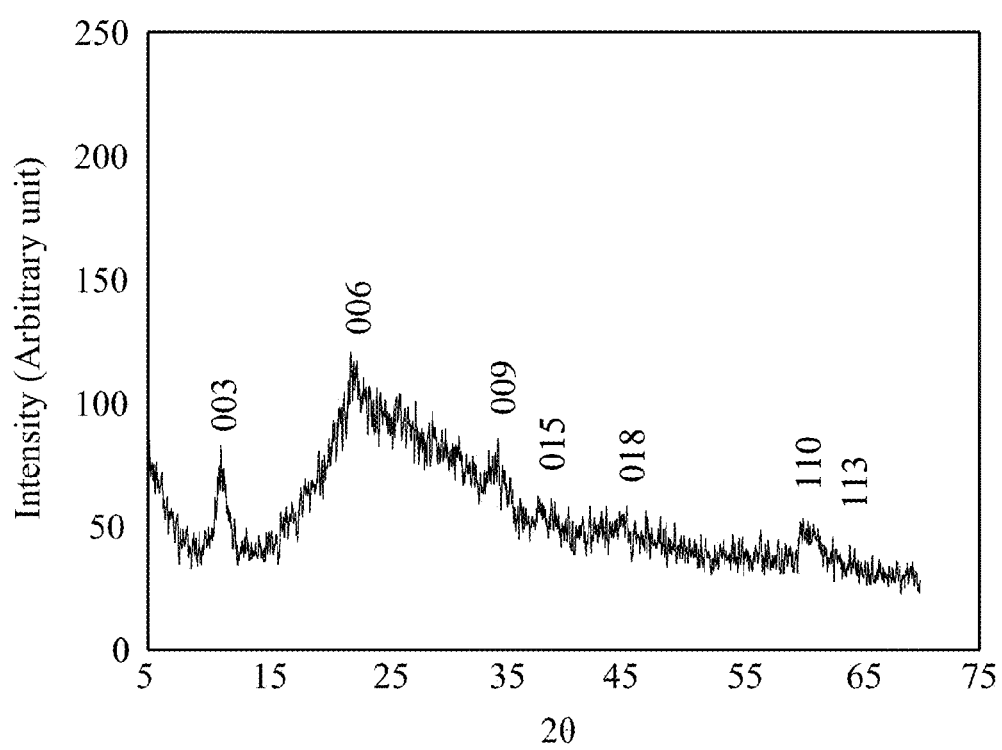
FIG. 6 is an XRD pattern of the layered double hydroxide immobilized on the carbon support in Preparation Example 4.

Based on the XRD result as shown in FIG. 6, it could be observed that the dominant characteristic peak of $[Mg_{0.74}Al_{0.14}Zr_{0.13}(OH)_2][(CO_3)_{0.26} \cdot 1.16H_2O]$ comprises peaks [003], [006], [009] and [110]. Accordingly, it is confirmed that MgAlZr-LDH was indeed immobilized on the surface of the activated carbon. In addition, the content of MgAlZr-LDH in the composite is 52% by thermogravimetric analysis.

Preparation Example 5: Preparation of Composite Electrode

The immobilized LDH of Preparation Example 1, polyvinylidene fluoride (PVDF, MW: 534,000) and graphite powder (particle diameter 2.7 μm) were prepared in a weight ratio of 80:10:10. After mixing, the mixed material powder and N-methyl pyrrolidone (NMP) solvent were stirred evenly as an electrode slurry.

Test Example 1: Adsorption Test of Composite

The activated carbon (AC) and AC/LDH powder of Preparation Example 1 were used in the adsorption test for examining the selectivity to phosphorus.

0.1 g of AC/LDH powder was added into 300 mL of raw water while AC was added for performing a blank test. The raw water was a mixed solution of 10 mg/L of phosphate ($Na_2HPO_4$) and 10 mg/L of sulfate ($Na_2SO_4$). The pH value of the raw water was 7 to 8 and the temperature of that was 25° C. In adsorption test, a sample bottle containing 300 mL of raw water was placed on the oscillator. The rotation rate of the oscillator was 200 rpm. After the adsorption test had been carried out for 72 hours, the water sample was filtrated by using 0.45 μm filter. The phosphate content in the filter was analyzed by ion chromatograph, and the removal rate of phosphate was calculated.

According to the result of phosphorus adsorption test as shown in Table 1, in the mixed solution of 10 mg/L of phosphate and sulfate, the phosphate adsorption capacity of AC and AC/LDH were 1.74 mg/g and 17.4 mg/g, respectively. That is, the phosphate adsorption capacity of the activated carbon modified with MgMn-LDH was 10 times higher than the pristine AC. The distribution coefficients of AC and AC/LDH to $HPO_4^{2-}$ and $SO_4^{2-}$ were 2 and 82. The selectivity of AC/LDH was 41 times higher than that of AC. Accordingly, it is confirmed that the AC/LDH composite had remarkably high selectivity to phosphorus.

TABLE 1

| Composite | | Blank test | AC/LDH of Preparation Example 1 |
|---|---|---|---|
| Adsorption capacity (mg/g) | $HPO_4^{2-}$ | 1.74 | 17.4 |
|  | $SO_4^{2-}$ | 0.87 | 0.32 |
| Distribution coefficient Kd (L/g) | $HPO_4^{2-}$ | 0.14 | 1.63 |
|  | $SO_4^{2-}$ | 0.07 | 0.02 |
| Selectivity coefficient ($Kd_{HPO4^{2-}}/Kd_{SO4^{2-}}$) | | 2 | 82 |

Kd = ion adsorbance (mg/g)/ion concentration (mg/L)

Test Example 2: Electroadsorption Test of Composite Electrode

The slurry for preparing the composite electrode was coated on the titanium foil as anode with a wet film thickness of 300 μm, and it was then dried at 140° C. in the oven for 2 hours. The cathode was platinum. When the preparation of the electrode was completed, the electroadsorption capacity to phosphorus was analyzed. The raw water was a mixed solution of 10 mg/L of phosphate ($Na_2HPO_4$) and sulfate ($Na_2SO_4$). This test was conducted under the condition of 1 V of voltage and 30 minutes of electroadsorption time.

As shown in Table 2, the electrode coated with AC material (Control) would adsorb $HPO_4^{2-}$ and $SO_4^{2-}$ at the same time, and it had no phosphorus selectivity. However, the AC/LDH electrode prepared according to the present invention showed relatively higher adsorption capacity towards $HPO_4^{2-}$ than $SO_4^{2-}$. The electrode according to the present invention had remarkably high selectivity to phosphorus.

Further, according to the result of phosphate adsorption rate as shown in Table 2, the phosphate adsorption rate of the electrochemical removal method was 16.5 times higher than the adsorption rate of the suspended powder adsorbent. The data indicate that the electrochemical removal method by use of electric-driving force enhanced the selective phosphorus adsorption rate and effectively shortened the adsorption time. Accordingly, the method for electrochemical removal of phosphorus indeed showed its superiority.

TABLE 2

| Electrode material | The content of the layered double hydroxide, based on the total weight of the composite (%)* | Electro-adsorption capacity (mg/g) | | Phosphate adsorption rate (μg/g · min) | | Distribution coefficient | |
|---|---|---|---|---|---|---|---|
| | | $HPO_4^{2-}$ | $SO_4^{2-}$ | Electrochemical removal of phosphorus | Suspended powder adsorbent | $HPO_4^{2-}$ | $SO_4^{2-}$ |
| Control | 0 | 2.45 | 8.06 | 81.7 | 0.62 | 0.221 | 0.770 |
| AC/LDH1 (Preparation Example 2) | 25 | 1.91 | 0.59 | 63.7 | — | 0.166 | 0.057 |
| AC/LDH2 (Preparation Example 1) | 50 | 2.96 | 0.07 | 98.7 | 5.99 | 0.231 | 0.006 |
| AC/LDH3 (Preparation Example 3) | 65 | 2.35 | 0.02 | 78.4 | — | 0.204 | 0.002 |
| AC/LDH4 (Preparation Example 4) | 52 | 1.95 | 0.30 | 65.0 | — | 0.166 | 0.029 |

*The composite was carbon support and layered double hydroxide.

Besides, for comparing the phosphate adsorption capacity of the electrode under different applied voltage, the electroadsorption tests were conducted in the condition of 0.5 V, 1.0 V and 1.2 V for 30 minutes. The electrode was prepared by the slurry of Preparation Example 1, and the raw water was a mixed solution of 10 mg/L of phosphate ($Na_2HPO_4$) and sulfate ($Na_2SO_4$). The result showed that the $HPO_4^{2-}$ electrosadsorption capacity of the electrode according to the present invention with 0.5 V, 1.0 V and 1.2 V was 2.96 mg/g, 2.96 mg/g and 3.90 mg/g, respectively. Compared to 0.5 V and 1.0 V, the phosphate adsorption capacity could be increased 32% under an operating voltage of 1.2 V. Accordingly, the ability of phosphorus adsorption was affected by the electric-driving force. Therefore, in one embodiment, the voltage applied to the pair of distal electrodes is 0.5 V to 2.0 V.

The above-described descriptions of the detailed embodiments are only to illustrate the principle and efficacy of the present invention, and it is not to limit the present invention. It is possible for one person skilled in the art to modify the above embodiments without departing from the spirit and scope of the present invention. The scope of present invention, therefore, should be defined by the appended claims.

The invention claimed is:

1. A composite, comprising:
    a carbon support; and
    a layered double hydroxide immobilized on the carbon support, wherein the content of the layered double hydroxide is from 25% to 65%, based on the total weight of the composite.

2. The composite according to claim 1, wherein the carbon support comprises at least one selected from the group consisting of activated carbon, bamboo charcoal, carbon nanotube, graphene and acetylene black.

3. The composite according to claim 1, wherein the layered double hydroxide is Mg—Mn layered double hydroxide, Zn—Al layered double hydroxide or Mg—Al—Zr layered double hydroxide.

4. An electrode, comprising:
a current collector; and
a composite mounted on the current collector; wherein the composite comprising:
  a carbon support; and
  a layered double hydroxide immobilized on the carbon support, wherein the content of the layered double hydroxide is from 25% to 65%, based on the total weight of the composite.

5. The electrode according to claim 4, wherein the carbon support comprises at least one selected from the group consisting of activated carbon, bamboo charcoal, carbon nanotube, graphene and acetylene black.

6. The electrode according to claim 4, wherein the electrode further comprises a conducting component.

7. The electrode according to claim 6, wherein the conducting component comprises at least one selected from the group consisting of graphite, carbon black, carbon nanotube, graphene and acetylene black.

8. The electrode according to claim 4, wherein the electrode further comprises a binder, and the composite is mounted on the current collector by the binder.

9. The electrode according to claim 8, wherein the binder is polyvinylidene fluoride or polytetrafluoroethylene.

10. The electrode according to claim 4, wherein the layered double hydroxide is Mg—Mn-layered double hydroxide, Zn—Al-layered double hydroxide or Mg—Al—Zr-layered double hydroxide.

11. The electrode according to claim 4, wherein the current collector is nickel, copper, titanium, stainless steel or graphite.

12. An apparatus for electrochemical removal of phosphorus, comprising:
at least one electrochemical cell, comprising:
  a pair of distal electrodes disposed in the electrochemical cell; and
  a plural of median electrodes disposed in the electrochemical cell and placed between the pair of distal electrodes; wherein the distal electrodes and the plural of median electrodes are the electrode according to any one of claims 4 to 11.

13. The apparatus for electrochemical removal of phosphorus according to claim 12, wherein each of the median electrodes has at least one perforation.

14. The apparatus for electrochemical removal of phosphorus according to claim 12, wherein the median electrodes have an insulator placed between each of them, and/or the distal electrodes and the median electrodes have an insulator placed between each of them.

15. A method for electrochemical removal of phosphorus, comprising:
carrying a liquid containing phosphorus through the apparatus for electrochemical removal of phosphorus according to any one of claims 12 to 14; and
applying a voltage to the electrodes for electrochemically removing phosphorus.

16. The method for electrochemical removal of phosphorus according to claim 15, wherein the phosphorus concentration of the liquid carried through the electrochemical cell is from 1 mg/L to 1000 mg/L.

17. The method for electrochemical removal of phosphorus according to claim 15, wherein the voltage applied to the electrodes is 1.2 V to 2.0 V.

* * * * *